Figure 3:
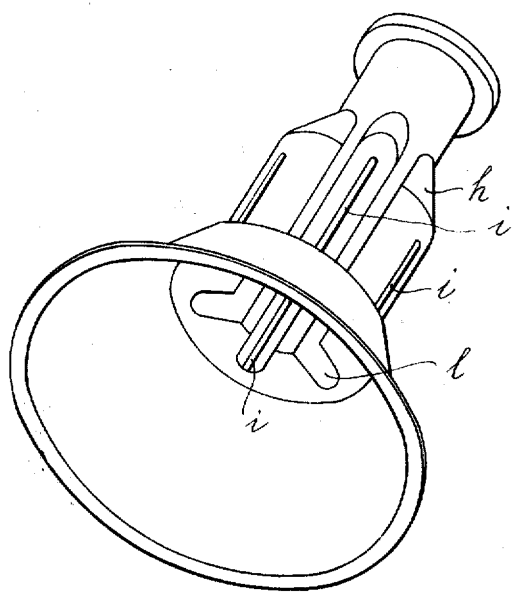

B. A. O. PROLLIUS.
CENTRIFUGAL SEPARATOR.
APPLICATION FILED AUG. 8, 1906.
922,037. Patented May 18, 1909.
2 SHEETS—SHEET 1.
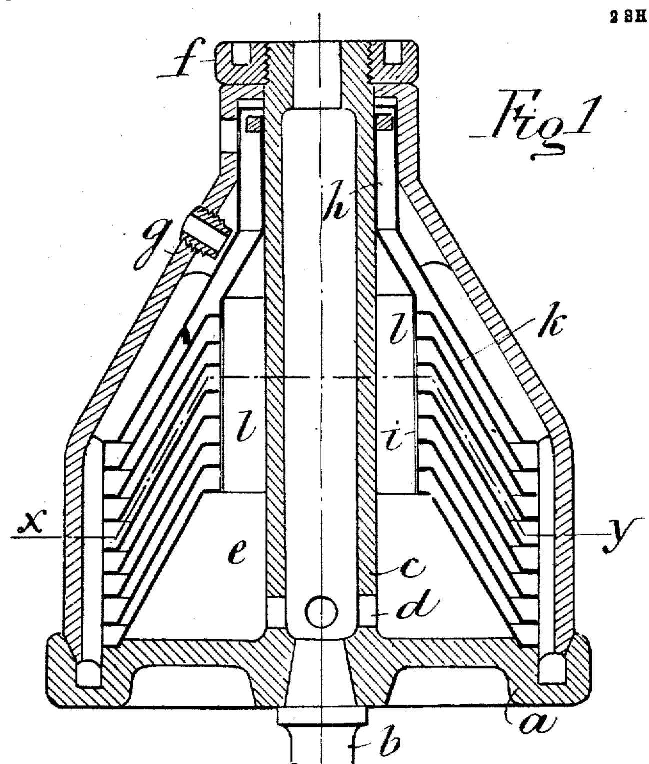
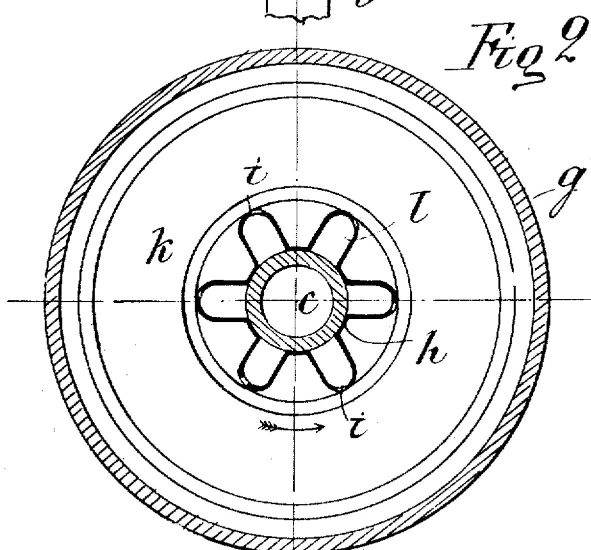
Witnesses
J. M. Okynkoop.
A. Knight.
Inventor
Bernhard Adolf Otto Prollius
by Knight Bros
Att'ys.

B. A. O. PROLLIUS.
CENTRIFUGAL SEPARATOR.
APPLICATION FILED AUG. 8, 1906.

922,037. Patented May 18, 1909.

2 SHEETS—SHEET 2.

Witnesses
J. M. Wynkoop
Ida T. Stanley

Inventor
Bernhard Adolf Otto Prollius,
By Knight Bros
Attys.

UNITED STATES PATENT OFFICE.

BERNHARD ADOLF OTTO PROLLIUS, OF COPENHAGEN, DENMARK.

CENTRIFUGAL SEPARATOR.

No. 922,037. Specification of Letters Patent. Patented May 18, 1909.

Application filed August 8, 1906. Serial No. 329,711.

*To all whom it may concern:*

Be it known that I, BERNHARD ADOLF OTTO PROLLIUS, engineer, subject of Sweden, residing at Torvegade No. 50, Copenhagen, in the Kingdom of Denmark, have invented new and useful Improvements in Centrifugal Separators, of which the following is a specification.

Centrifugal drums or apparatus are already well known in which milk passes upwardly from a centrally arranged milk inlet chamber into distributing pipes and thence through openings in the sides of the pipes to the spaces between the liner plates. In these drums the distributing pipes are generally made integral with the central supply pipe of the drum, through which pipe the milk is conveyed to the central chamber. This construction of the distributing device renders it however difficult to fit the separate parts of the drum together, and further the fact that distributing pipes are closed at the top makes it exceedingly difficult to clean the pipes. Furthermore the openings in the sides of the known distributing pipes are situated at the points having the greatest distance from the central axis of the drum, an arrangement which however has been found to be inadequate, because the milk flowing out of the openings is not distributed equally over the liner plates.

According to the present invention the distributing pipes are formed by a loose casing removably inserted on and fitting closely around the central supply pipe and having in its lower portion a number of separate inwardly open hollow channels communicating at their bottom with the central chamber and communicating with the spaces between the liner plates through openings, which seen in the direction of rotation of the drum are situated close behind those points of the casing, which have the greatest distance from the central axis of the drum. By such an arrangement the distributing device can be easily cleaned as the channels, when the loose casing is removed from the central pipe, lie fully open for inspection and cleaning; furthermore the described location of the openings secures an equal distribution of the milk over the liner plates.

One embodiment of a centrifugal apparatus according to this invention is illustrated, by way of example, in the accompanying drawings, in which—

Figure 1 is a vertical section through the center of the centrifugal drum; Fig. 2 is a section on line X—Y of Fig. 1, and Fig. 3 is a perspective view of the loose distributing casing removed from the central supply pipe of the drum.

The bottom portion *a* of the drum to which is secured the spindle *b* is integral with the pipe *c* which is arranged in the center of the drum and provided at the bottom with outlet openings *d*, through which the milk introduced from the top into the pipe escapes into the chamber *e* at the lower part of the drum. At the top, the pipe *c* is provided with an exterior screw-thread and with a nut *f*, whereby the casing *g* of the drum is secured to the bottom portion *a* in well known manner.

A distributing cap or casing *h* is arranged around the central pipe *c*; its cross-section, as shown in Fig. 2, is star shaped, so that a number of separate inwardly open hollow projections are produced. Close behind the points of the hollow projections, which seen in the direction of rotation of the drum (see the arrow Fig. 2) have the greatest distance from the central axis of the drum, are arranged openings *i* through which the milk is distributed to the spaces between the liner plates. The cap *h* fits tightly around the pipe *c* at the top so that a number of distributing channels *l* corresponding to the projections of the cap are produced. These distributing channels are closed at the top, and their inner surface is formed by the outer wall of the central pipe *c*, while the projections of the cap form the outer surface of the channels, and the channels are separated from each other by the portions of the cap *h* which contact with the central pipe *c*. The distributing channels *l* which at the bottom open into the chamber *e* have the same action as the well known pipes, but they can be easily cleaned, as, after the nut *f* and the drum casing *g* are removed, the cap *h* can be taken out and cleaned on the inside. In this way, the pipe *c* and the interior of the chamber are made accessible and can also be easily cleaned. After cleaning, the parts can be easily fitted together again and the nut *f* can be tightened.

Having thus described the invention, what I claim and desire to secure by Letters Patent is:

In a centrifugal machine the combination with a drum having a central chamber at its bottom and having a number of liner plates and provided with a central inlet-pipe through which the liquid is introduced into the central chamber, of a loose casing removably inserted on and fitting closely around the inlet-pipe and having in its lower portion a number of separate inwardly open hollow channels communicating at their bottom with the central chamber and communicating with the spaces between the liner plates through openings, which seen in the direction of rotation of the drum are situated close behind those points of the casing, which have the greatest distance from the central axis of the drum.

In testimony whereof I have signed my name to this specification in the presence of two subscribing witnesses.

BERNHARD ADOLF OTTO PROLLIUS.

Witnesses:
MARCUS MÖLLER,
HAROLD FROST.